US007894584B2

(12) United States Patent
Cesarini et al.

(10) Patent No.: US 7,894,584 B2
(45) Date of Patent: Feb. 22, 2011

(54) MESSAGING INTERFACE BETWEEN TELECOMMUNICATIONS SERVICE PROVIDER PROCESSING SYSTEMS

(75) Inventors: Andrea Cesarini, Acilia Roma (IT); Alessandro Cugno Garrano, Florano al Serlo (IT)

(73) Assignee: Accenture Global Services Limited, Dublin (IE)

( * ) Notice: Subject to any disclaimer, the term of this patent is extended or adjusted under 35 U.S.C. 154(b) by 1175 days.

(21) Appl. No.: 11/403,275

(22) Filed: Apr. 13, 2006

(65) Prior Publication Data

US 2007/0226306 A1 Sep. 27, 2007

(30) Foreign Application Priority Data

Mar. 22, 2006 (EP) .................................. 06425191
Mar. 22, 2006 (IT) .......................... BS2006A0065

(51) Int. Cl.
*H04M 3/42* (2006.01)

(52) U.S. Cl. ............................ 379/201.03; 379/201.12; 379/126; 379/114.03

(58) Field of Classification Search ................. 707/610, 707/611, 623, 626; 379/114.03, 126, 201.02, 379/201.03, 201.12, 207.02
See application file for complete search history.

(56) References Cited

U.S. PATENT DOCUMENTS

2004/0103103 A1 5/2004 Kalthoff et al.
2004/0117377 A1 6/2004 Moser et al.

OTHER PUBLICATIONS

European Search Report issued in European Patent Application No. EP 06 42 5191; completed Sep. 26, 2007.
Canadian Office Action for Canadian Application No. 2,549,417 dated Nov. 6, 2009.
Canadian Office Action Response for Canadian Application No. 2,549,417 dated May 6, 2010.

*Primary Examiner*—Olisa Anwah
(74) *Attorney, Agent, or Firm*—Brinks Hofer Gilson & Lione

(57) ABSTRACT

A messaging interface provides the flexibility to allow interchangeability of underlying telecommunications service provider processing systems, such as billing systems. At the same time, the messaging interface extends the underlying functionality of the telecommunications service provider processing system to a series of business events defined as part of a common data model shared across multiple telecommunication service provider processing systems. The messaging may implement a mechanism for tracking the implementation of the business event in the underlying telecommunication service provider processing systems.

18 Claims, 10 Drawing Sheets

MESSAGING INTERFACE BETWEEN TELECOMMUNICATIONS SERVICE PROVIDER PROCESSING SYSTEMS

PRIORITY CLAIM

This application claims the benefit of EPO Application No. 06425191.1, filed Mar. 22, 2006 and Italian Application No. BS2006A000065, filed Mar. 22, 2006, both of which are incorporated herein by reference in their entirety.

BACKGROUND OF THE INVENTION

1. Technical Field

This invention relates to telecommunications processing systems. In particular, this invention relates to a flexible and independent messaging interface between telecommunications service provider processing systems.

2. Related Art

Rapid advances in data processing and telecommunications technology have lead to a vast array of communication services available to the consumer. Such telecommunication services include traditional telephone service, Internet service, cable television service, cellular phone service, paging service, combined voice and data delivery service, and many other services.

The advances in technology, though rapid, did occur over time. As a result, many telecommunications services providers began with telecommunications system architectures directly supporting a small subset of the services now available today. The early architectures were specific to individual services, such as wireline telephone services. Furthermore, the architectures commonly employed service specific billing systems, such as billing systems tailored for wireline telephone billing. While these service specific billing systems were well suited for implementing billing related functions, these systems may not be optimized for other tasks, such as managing billing data and the like.

Beyond billing systems, each architecture also included other dedicated supporting systems, such as customer care systems. The customer care systems were responsible for communicating and receiving messages to and from the billing systems, such as messages which established new customers. In other words, as they began to offer more products and services, telecommunications service providers were faced with the time consuming, expensive, and difficult task of installing, maintaining, and upgrading multiple independent systems in multiple independent architectures.

As these systems were integrated into a unified architecture, developers took advantage of the built-in functionality of pre-existing billing systems and developed tightly coupled systems. As a result, enhancing legacy architectures poses significant technical challenges. One technical challenge lies in extending functionality to process new products and services, because the tightly coupled nature of current integrations has left the architectures limited to performing only those functionalities offered by the legacy billing systems. Thus, previous architectures could only support limited function sets supported by the legacy systems and associated integration components. In other words, these systems could be integrated only to the degree that the underlying support system offered functions for performing given tasks. Another technical challenge is tracking message processing. In the past, message tracking was limited by the functionalities of the legacy systems. Typically, legacy billing systems do not provide any capability to enable the tracking of an entity's identifier exchanged between messages from, for example, a CRM system to the billing system. As a result, telecommunication service providers are left exposed to the risk of duplicated data due to the multiple processing of the same message. Moreover, these limitations make the analysis of any rejected messages, such as invalid messages, extremely complex. These limitations hamper the telecommunications industry, which is one that continually needs to improve and evolve its existing products and services, and which frequently introduces new products and services.

Accordingly, a need has long existed for an improved rating system for a telecommunications service provider.

SUMMARY

A messaging interface implements several technical solutions to the technical problems associated with efficiently, flexibly, and reliably extending the functionality of a telecommunications service provider processing architecture in order to facilitate communications between telecommunication service provider processing systems. As a result, the messaging interface reduces the difficulty, cost, and time expenditures typically associated with integrating a new component into the architecture. The messaging interface also eliminates duplicative processing of events, as well as the duplicative storage of information and duplicative communications among the various telecommunication service provider processing systems which flow as a result of the additional processing.

One technical solution is layering the functionalities of the messaging interface to make the messaging interface highly reusable and extendible. Specifically, functionalities of the messaging interface that depend on the underlying support system may be logically separated from those functionalities that are independent of the underlying support system. As a result, only certain layers of the messaging interface may need to be adapted to integrate a new support system into the architecture. The remaining layers need not change.

Another technical solution lies in removing core message processing from the underlying support system and relocating the processing to the messaging interface. In the past, system architects were at the mercy of the processing performance and functionalities of the underlying support system. By moving message processing to the messaging interface, the system architect can define a common set of message or events that may be used across multiple different support systems. Again, this alleviates the dependency of the architect on the capabilities of the support system, and allows the architect to choose from a wider variety of underlying support systems. This also allows for more efficient processing of messages by freeing the underlying support system to only perform processing related to its underlying function, such as billing related processing for example, while allowing message processing, routing, and tracking to be performed outside of the underlying support system.

Another technical solution is provided in maintaining hierarchical relationships between support systems. In particular, the hierarchies of data elements in one system may be maintained as data is transferred through the architecture, such as hierarchical relationships between products, services and the like. This ensures the integrity of product offerings and the like, for example, such that child products or services may not be inadvertently processed without an underlying parent product. As a result, duplicative and/or erroneous processing of events is eliminated.

Yet another technical solution is provided by maintaining a correlation between support system specific product identifiers. For example, a table may be used to store identifiers of products, services and the like. Identifiers used in specific support systems may be associated such that the table provides a mapping from the identifier used in one system to a corresponding identifier used in a second system. This mapping allows the interface to track processing of orders and verify that account modifications are intended for valid products that already exist in each system, eliminating duplicative and/or erroneous processing by the systems.

In one aspect, a messaging interface for communication between telecommunications service provider processing systems is provided. The messaging interface may include a product instance table that includes multiple records which establish interrelationships between a first product instance identifier associated with a first telecommunications service provider processing system and a second product instance identifier associated with a second telecommunications service provider processing system.

The messaging interface may also include a memory. The memory may include message parameters which report an event. The event may be part of a common data model used across multiple telecommunication service provider systems. For example, the events may include a 'Create Customer' business event, a 'Modify Customer General Data' event, a Modify Customer Fiscal Address Data event, a Create Billing Account Data event, a Modify Billing Account General Data event, a Modify Billing Account Billing Profile Data event, a Modify Billing Account Bill-to Person Data event, a Modify Billing Account Bill-to Address Data event, a Modify Billing Account Payment Data event, or an Service Order event.

The messaging interface may also include an interface program operable to implement the event in the second telecommunications service provider processing system. The interface program may include instructions which determine the first product instance identifier using at least one of the message parameters, perform an action on the second telecommunications service provider processing system associated with the second product instance identifier, and update the product instance table using the first product instance identifier and the second product instance identifier. Finally, a processor may be coupled to the memory and the product instance table which executes the interface program.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the messaging interface may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the communications architecture will be described, methods, systems, and articles of manufacture consistent with the messaging interface may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors. Systems may be implemented in hardware, software, or a combination of hardware and software in one processing system or distributed across multiple processing systems.

Figure 1:
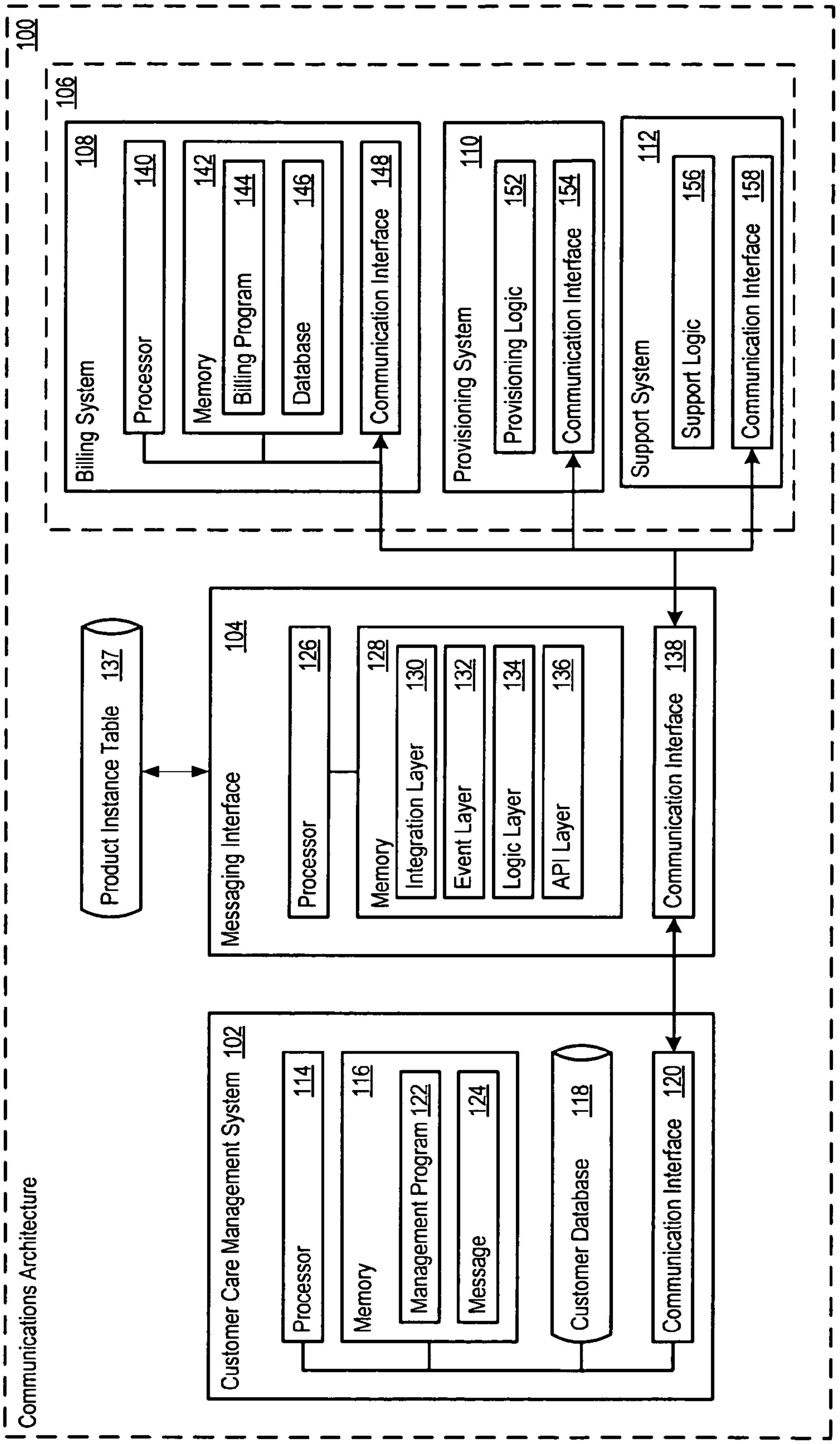
FIG. 1 shows an exemplary telecommunications network which facilitates communication between external applications via various business events.

FIG. 1 shows a telecommunications messaging architecture 100. The architecture 100 includes a Customer Care management system 102, a messaging interface 104, and support systems 106. As shown in FIG. 1, the support systems 106 include a billing system 108, a provisioning system 110, and other support systems 112. The support systems 106 may fulfill a wide range of roles within the architecture 100, such as billing, provisioning, invoicing, and other support roles performed by back-end systems in any industry such as the telecommunications industry, utility (e.g., gas or electric) industry, commercial industry, or any other industry.

The customer care management system 102 includes a processor 114, a memory 116, and a customer database 118. The customer care management system 102 also includes a communication interface 120. A customer care management program 122 in the memory 116 prepares messages 124.

In one implementation, the processor 114 in the customer care management system 102 executes Siebel™ 7.8 CME and Siebel™ Server under the Windows™ operating system, the UNIX operating system, the SUN Solaris™ operating system, or any other operating system. Additionally, an Oracle™ or Microsoft™ SQL server platform may implement the customer database 118. However, additional or different customer care management programs may be implemented in the customer care management system 102.

The customer care management system 102 communicates the messages 124 through the communication interface 120 to the messaging interface 104. A message may define an event, such as a request for the creation of a customer account in the billing system. Alternatively, multiple messages 124 may be used to define a single event, or a single message 124 may define multiple events. Exemplary messages or events are described in more detail below. The messaging interface 104 may also include a processor 126 and a memory 128.

As shown in FIG. 1, the messaging interface 104 is implemented as an independent processing system. However, the messaging interface 104 may be implemented in other manners. For example, the messaging interface 104 may be implemented as hardware and/or software integrated with the customer care management system 102, the billing system 108, or other systems in the communications architecture 100. As another example, the messaging interface 104 may be implemented as an extension to a messaging protocol processing layer (e.g., a message adaptation layer or message transport layer) within or external to the customer care management system 102 or billing system 108.

The messaging interface 104 may include layers that separate certain functionalities of the interface 104. As illustrated, the interface 104 may include an integration layer 130, an event layer 132, an logic layer 134, and an API layer 136. The integration layer 130 may convert a message 124 to a representation that conforms to a standard or common data model that is enforced across two or more of the systems 102 and 106 of the architecture 100.

The event layer 132 may include functions for transforming the standard or common data model representation into data types for use in a specific system of the architecture 100. The logic layer 134 may include logic for managing calls to system specific functions available through an API layer 136 offered by a specific system of the architecture 100. The logic layer 134 may invoke these functions to implement a message 124 in the underlying support system 106 of the architecture 100. Finally, the messaging interface 104 may be coupled with a product instance table 137 for maintaining relationships between identifiers used to track products, services, and the like, in the various support systems of the architecture 100. Herein, the phrase "coupled with" is defined to mean directly connected to or indirectly connected through one or more intermediate components. Such intermediate components may include both hardware and software based components. The layers and their respective functionalities, as well as the product instance table 137, are described in more detail below.

The support systems 106 include the billing system 108. FIG. 1 shows that the billing system 108 includes a processor 140, a memory 142, and a communication interface 148. The memory 142 may store a billing program 144 as well as a database 146 in which the billing system 108 stores various billing related information. Typically, the information is stored in the billing system database 144 according a data model associated with the billing system 108. In other words, the billing system 108 includes hardware and software support logic which processes billing action requests. The support logic in the billing system 108 may be implemented with commercially available billing software packages, such as Portal's Infranet™ billing package, Convergys Geneva™ billing package, Intec Singl.eView™, Comverse FX™ billing package as well as with custom billing software.

Communication between the customer care management system 102, the messaging interface 104, and the support systems 106 may be accomplished in many ways. In some implementations, the communication interfaces 120, 136, 146, 150, and 154 may be network sockets defined by IP addresses, port numbers, and communication protocols. The messages may travel between the systems 102, 104, and 106 according to a wide range of protocols, including Tibco™ Rendezvous Messaging protocol, IBM MQseries™ protocol, Java Message Service protocol, or HTTP. In other implementations, the systems 102, 104, and 106 communicate via interprocess communication, messaging, or signaling.

The architecture 100 may incorporate message passing and application integration technologies such as TIBCO Business Work™ messaging, BizTalk™ messaging, BEA WLI™ and Vitria™ telecommunications solutions. Adapters may be provided between the customer care management system 102 and the message routing system 104, as well as between the messaging interface 104 and the support systems 106. The adapters may support transformation of the messages and/or message content from a format defined by one schema (e.g., a schema for messages to adhere to in the customer care management system 102) to another format defined by another schema (e.g., a schema for messages to adhere to in the messaging interface 104 and/or support systems 106).

In one implementation, the messages 124 may contain data described by extensible Markup Language (XML) tags and the adapters perform transformation according to extensible Stylesheet Language for Transformations (XSLT) stylesheets. The transformations may transform data between schemas for any of XML, Web Service Definition Language (WSDL), extensible Scheme Diagram (XSD), as examples. The messages may move between systems using any kind of transportation or data access protocol, including HTTP, Simple Object Access Protocol (SOAP), or other protocols in place at the customer care management system 102, messaging interface 104, and/or support systems 106. As described above, the messages 124 may represent the occurrence of or a request for an event to be processed by the support systems 106, such as the billing system 108.

Figure 2:
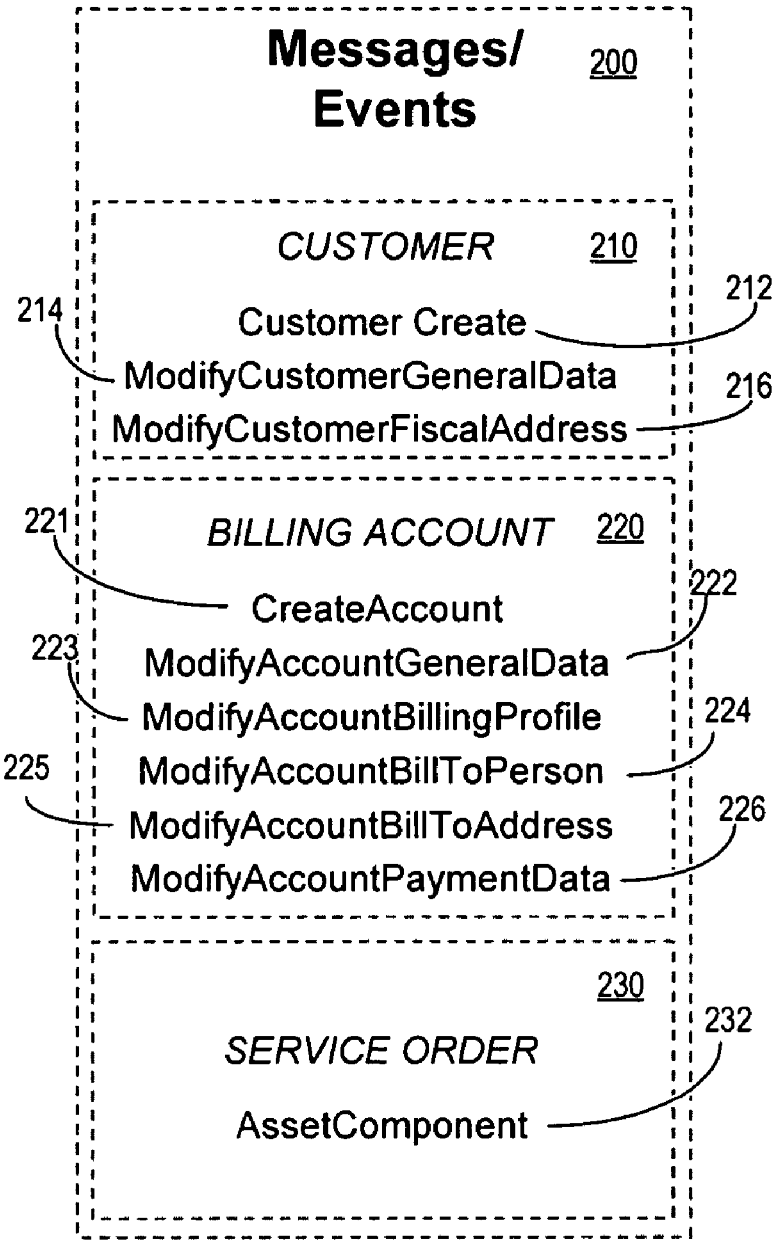
FIG. 2 shows an exemplary set of business events that form the basis of an end-to-end coherent framework for a telecommunications system architecture.

FIG. 2 shows examples of messages 200 supported by the architecture 100 for integrating the customer care system 102 and billing system 108. The architecture 100 may also support multiple different reply messages, such as a reply message for each supported event 200. Alternatively, or additionally, standard reply messages may be used to respond to multiple events 200. Any other messages or events may be used.

As shown in FIG. 2, the messaging interface 104 may support various types of messages 200. For example, the interface 104 may support messages that define Customer related events 210 for handling Customer level data, messages that define Billing Account related events 220 for handling Billing Account level data, and messages that define Service Order related events 230 for handling the processing of orders for products and services. The messaging interface 104 may support other types of events.

In one implementation, the Customer related events 210 include a CreateCustomer business event 212, a ModifyCustomerGeneralData business event 214, and a ModifyCustomerFiscalAddress business event 216. The CreateCustomer event 212 may occur when an order for a new customer is submitted. When the first order for a new customer is submitted, a CreateCustomer message 212 may be sent including the information used to create the account hierarchy in the billing system 108. The CreateCustomer event 212 may be mapped to a specific entity, such as any data field in the billing system database 144, so as to support the same customer and billing account hierarchy in the customer care system 102 and the billing system 108. In the implementation supported by the data model described below with regard to FIG. 3, successful processing of the CreateCustomer event 212 by the billing system 108 may occur before the creation of a Billing Account because a customer can have one or more Billing Accounts. Optionally, the CreateCustomer event 212 may include a flag or other parameter which differentiates between the creation of a residential customer or a business customer. An exemplary XML message defining a CreateCustomer event 212 is shown in Table 1.

TABLE 1

CustomerCreate event

```
<s:element name="CustomerCreate">
  <s:complexType>
    <s:sequence>
      <s:element minOccurs="0" name="CustomerCode" type="s:string"/>
      <s:element minOccurs="0" name="AcquisitionDate" type="s:string"/>
      <s:complexType name="Customer">
            <s:sequence>
              <s:element minOccurs="0" name="PhyFlag" type="s:string"/>
              <s:element minOccurs="0" name="Name" type="s:string"/>
              <s:element minOccurs="0" name="FirstName" type="s:string"/>
              <s:element minOccurs="0" name="Language" type="s:string"/>
              <s:element minOccurs="0" name="MSegment" type="s:string"/>
              <s:element minOccurs="0" name="OrgCode" type="s:string"/>
              <s:element minOccurs="0" name="PhoneNum" type="s:string"/>
              <s:element minOccurs="0" name="FaxNum" type="s:string"/>
              <s:element minOccurs="0" name="EMail" type="s:string"/>
              <s:element minOccurs="0" name="PersonalID" type="s:string"/>
            </s:sequence>
      </s:complexType>
      <s:complexType name="Address">
        <s:sequence>
          <s:element minOccurs="0" name="StreetType" type="s:string"/>
          <s:element minOccurs="0" name="AddressNum" type="s:string"/>
          <s:element minOccurs="0" name="Address" type="s:string"/>
          <s:element minOccurs="0" name="City" type="s:string"/>
          <s:element minOccurs="0" name="ZIP" type="s:string"/>
          <s:element minOccurs="0" name="State" type="s:string"/>
          <s:element minOccurs="0" name="Country" type="s:string"/>
        </s:sequence>
      </s:complexType>
    </s:sequence>
  </s:complexType>
</s:element>
```

The ModifyCustomerGeneralData event 214 may be used to update any of the customer general data attributes. Customer general data may refer to any customer account data. For example, customer general data may include data about the address of the customer and other customer specific information like name, personal ID or customer type. In one implementation, the customer type may include an individual or residential type, or business type. Optionally, specific business events may modify data associated with a customer. For example, the ModifyCustomerFiscalAddress event 216 may update the fiscal address of a customer. Exemplary XML messages defining a ModifyCustomerGeneralData event 214 and a ModifyCustomerFiscalAddress event 216 are shown in Tables 2 and 3, respectively.

The Billing Account related events 220 may include events for handling data related to billing accounts. In one implementation, the Billing Account related events 220 may include a CreateAccount event 221, a ModifyAccountGeneralData event 222, a ModifyAccountBillingProfile event 223, a ModifyAccountBillToPerson event 224, a ModifyAccountBillToAddress event 225, and a ModifyAccountPaymentData event 226. The CreateAccount event 221 may occur when an order for a new account is submitted. The CreateAccount event 221 may include information for recreating the account hierarchy in the billing system 108. The information may include a billing account code, a customer code, bill account code, a bill start date, a billing account object, a billing profile object, a payment data object, an address object, a contact object, and the like. The billing account objection may include a reason for a bill status change field, a bill status code field, a currency code field, a language field, an organizational code field, a tax type field, an account type field, and the like. The billing profile object may include a bill frequency field, a bill type field, a media type field, a payment method field, and the like. The payment data object may include a bank account number field, bank account type field, a bank branch field, a bank name field, a payer first name field, a payer last name field, a payer personal ID field, a credit card expiration date field, a credit card number field, a credit card type field, and the like. Finally, the address object may include a street type field, an address number field, a city field, a ZIP code field, a state field, a country field, a contact field, a contact first name field, a contact last name field, a contact title field, a contact phone field, a contact email field, an greetings field, and the like. The greetings field may be used to address the contact on the bill, and may include, for example, the concatenation of the Contact title, first name, and last name fields. Other information may also be used. An exemplary XML message defining a CreateAccount event 221 is shown in Table 4.

TABLE 2

CustomerModifyGeneralData event

```
<s:element name="CustomerModifyGeneralData">
  <s:complexType>
    <s:sequence>
      <s:element minOccurs="0" name="CustomerCode" type="s:string"/>
      <s:complexType name="Customer">
        <s:sequence>
            <s:element minOccurs="0" name="PhyFlag" type="s:string"/>
            <s:element minOccurs="0" name="Name" type="s:string"/>
            <s:element minOccurs="0" name="FirstName" type="s:string"/>
            <s:element minOccurs="0" name="Language" type="s:string"/>
            <s:element minOccurs="0" name="MSegment" type="s:string"/>
            <s:element minOccurs="0" name="OrgCode" type="s:string"/>
            <s:element minOccurs="0" name="PhoneNum" type="s:string"/>
            <s:element minOccurs="0" name="FaxNum" type="s:string"/>
            <s:element minOccurs="0" name="EMail" type="s:string"/>
            <s:element minOccurs="0" name="PersonalID" type="s:string"/>
        </s:sequence>
      </s:complexType>
    </s:sequence>
  </s:complexType>
</s:element>
```

TABLE 3

CustomerModifyFiscalAddress event

```
<s:element name="CustomerModifyFiscalAddress">
  <s:complexType>
    <s:sequence>
      <s:element minOccurs="0" name="CustomerCode"
      type="s:string"/>
      <s:complexType name="Address">
        <s:sequence>
          <s:element minOccurs="0" name="StreetType"
          type="s:string"/>
          <s:element minOccurs="0" name="AddressNum"
          type="s:string"/>
          <s:element minOccurs="0" name="Address"
          type="s:string"/>
          <s:element minOccurs="0" name="City" type="s:string"/>
          <s:element minOccurs="0" name="ZIP" type="s:string"/>
          <s:element minOccurs="0" name="State" type="s:string"/>
          <s:element minOccurs="0" name="Country"
          type="s:string"/>
        </s:sequence>
      </s:complexType>
    </s:sequence>
  </s:complexType>
</s:element>
```

TABLE 4

CreateAccount event

```
<s:element name="AccountCreate">
  <s:complexType>
    <s:sequence>
      <s:element minOccurs="0" name="BillAccountCode" type="s:string"/>
      <s:element minOccurs="0" name="CustomerCode" type="s:string"/>
      <s:element minOccurs="0" name="BillStartDate" type="s:string"/>
      <s:complexType name="BillingAccount">
        <s:sequence>
          <s:element minOccurs="0" name="BillStatusChangeReas" type="s:string"/>
          <s:element minOccurs="0" name="BillStatusCode" type="s:string"/>
          <s:element minOccurs="0" name="CurrencyCode" type="s:string"/>
          <s:element minOccurs="0" name="Language" type="s:string"/>
          <s:element minOccurs="0" name="OrgCode" type="s:string"/>
          <s:element minOccurs="0" name="TaxType" type="s:string"/>
          <s:element minOccurs="0" name="AccountType" type="s:string"/>
        </s:sequence>
      </s:complexType>
      <s:complexType name="BillingProfile">
        <s:sequence>
          <s:element minOccurs="0" name="BillFrequency" type="s:string"/>
          <s:element minOccurs="0" name="BillType" type="s:string"/>
          <s:element minOccurs="0" name="MediaType" type="s:string"/>
          <s:element minOccurs="0" name="PaymentMethod" type="s:string"/>
        </s:sequence>
      </s:complexType>
      <s:complexType name="PaymentData">
        <s:sequence>
          <s:element minOccurs="0" name="BankAccountNumber" type="s:string"/>
          <s:element minOccurs="0" name="BankAccountType" type="s:string"/>
          <s:element minOccurs="0" name="BankBranch" type="s:string"/>
          <s:element minOccurs="0" name="BankName" type="s:string"/>
          <s:element minOccurs="0" name="PayerFirstName" type="s:string"/>
          <s:element minOccurs="0" name="PayerLastName" type="s:string"/>
          <s:element minOccurs="0" name="PayerPersonalID" type="s:string"/>
          <s:element minOccurs="0" name="CreditCardExpirationDate"
type="s:string"/>
          <s:element minOccurs="0" name="CreditCardNumber" type="s:string"/>
          <s:element minOccurs="0" name="CreditCardType" type="s:string"/>
        </s:sequence>
      <<s:complexType name="Address">
        <s:sequence>
          <s:element minOccurs="0" name="StreetType" type="s:string"/>
          <s:element minOccurs="0" name="AddressNum" type="s:string"/>
          <s:element minOccurs="0" name="Address" type="s:string"/>
          <s:element minOccurs="0" name="City" type="s:string"/>
          <s:element minOccurs="0" name="ZIP" type="s:string"/>
          <s:element minOccurs="0" name="State" type="s:string"/>
          <s:element minOccurs="0" name="Country" type="s:string"/>
        </s:sequence>
      </s:complexType>
      <s:complexType name="Contact">
        <s:sequence>
          <s:element minOccurs="0" name="ContFirstName" type="s:string"/>
          <s:element minOccurs="0" name="ContLastName" type="s:string"/>
          <s:element minOccurs="0" name="ContactTitle" type="s:string"/>
          <s:element minOccurs="0" name="ContactPhone" type="s:string"/>
          <s:element minOccurs="0" name="ContactEmail" type="s:string"/>
        </s:sequence>
      </s:complexType>
    </s:sequence>
  </s:complexType>
</s:element>
```

A ModifyAccountGeneralData event 222 may occur when general information about a billing account needs to be updated. For example, general data for a billing account may include a reason for the status change, a status code, a currency code, a language identifier, an organizational code, a tax type, and an account type. Other data items may also be included. An exemplary XML message defining a ModifyAccountGeneralData event 222 is shown in Table 5.

TABLE 5

ModifyAccountGeneralData event

```
<s:element name=“AccountModifyGeneralData”>
  <s:complexType>
    <s:sequence>
      <s:element minOccurs=“0” name=“BillAccountCode” type=“s:string”/>
      <s:element minOccurs=“0” name=“LastUpdateDate” type=“s:string”/>
      <s:complexType name=“BillingAccount”>
        <s:sequence>
          <s:element minOccurs=“0” name=“BillStatusChangeReas” type=“s:string”/>
          <s:element minOccurs=“0” name=“BillStatusCode” type=“s:string”/>
          <s:element minOccurs=“0” name=“CurrencyCode” type=“s:string”/>
          <s:element minOccurs=“0” name=“Language” type=“s:string”/>
          <s:element minOccurs=“0” name=“OrgCode” type=“s:string”/>
          <s:element minOccurs=“0” name=“TaxType” type=“s:string”/>
          <s:element minOccurs=“0” name=“AccountType” type=“s:string”/>
        </s:sequence>
      </s:complexType>
    </s:sequence>
  </s:complexType>
</s:element>
```

The ModifyAccountBillingProfile event 223 may occur when information about the invoice for a billing account changes. Information related to a billing invoice may include the bill period, bill format, media type, payment method, and the like. The ModifyAccountBillToPerson event 224 may occur when information about a registered person of the billing account changes. This event 224 may include information such as first name, last name, phone number, and the like. The ModifyAccountBillToAddress event 225 may occur when information about the shipment address of a billing account changes. Information related to the shipment address may include a street name, address number, city, state, zip code, and the like. The ModifyAccountPaymentData event 226 may occur when information about the bank account and/or credit card data used to make payments on the billing account change. Information related to a bank account and/or credit card may include a bank account number, bank account type, bank branch, bank name, payer first name, payer last name, payer personal ID, credit card expiration date, credit card number, credit card type, and the like. Exemplary XML messages defining a ModifyAccountBillingProfile event 223, a ModifyAccountBillToPerson event 224, a ModifyAccount-BillToAddress event 225, and a ModifyAccountPayment-Data event 226 are shown in Tables 6, 7, 8, and 9, respectively.

TABLE 6

ModifyAccountBillingProfile event

```
<s:element name=“AccountModifyBillingProfile”>
  <s:complexType>
    <s:sequence>
      <s:element minOccurs=“0” name=“BillAccountCode”
      type=“s:string”/>
      <s:element minOccurs=“0” name=“LastUpdateDate”
      type=“s:string”/>
      <s:complexType name=“BillingProfile”>
        <s:sequence>
          <s:element minOccurs=“0” name=“BillFrequency”
          type=“s:string”/>
          <s:element minOccurs=“0” name=“BillType”
          type=“s:string”/>
          <s:element minOccurs=“0” name=“MediaType”
          type=“s:string”/>
          <s:element minOccurs=“0” name=“PaymentMethod”
          type=“s:string”/>
        </s:sequence>
      </s:complexType>
```

TABLE 6-continued

ModifyAccountBillingProfile event

```
    </s:sequence>
  </s:complexType>
</s:element>
```

TABLE 7

ModifyAccountBillToPerson event

```
<s:element name=“AccountModifyBillToPerson”>
  <s:complexType>
    <s:sequence>
      <s:element minOccurs=“0” name=“BillAccountCode”
      type=“s:string”/>
      <s:element minOccurs=“0” name=“LastUpdateDate”
      type=“s:string”/>
      <s:complexType name=“Contact”>
        <s:sequence>
          <s:element minOccurs=“0” name=“ContFirstName”
          type=“s:string”/>
          <s:element minOccurs=“0” name=“ContLastName”
          type=“s:string”/>
          <s:element minOccurs=“0” name=“ContactTitle”
          type=“s:string”/>
          <s:element minOccurs=“0” name=“ContactPhone”
          type=“s:string”/>
          <s:element minOccurs=“0” name=“ContactEmail”
          type=“s:string”/>
        </s:sequence>
      </s:complexType>
    </s:sequence>
  </s:complexType>
</s:element>
```

TABLE 8

ModifyAccountBillToAddress event

```
<s:element name=“AccountModifyBillToAddress”>
  <s:complexType>
    <s:sequence>
      <s:element minOccurs=“0” name=“BillAccountCode”
      type=“s:string”/>
      <s:element minOccurs=“0” name=“LastUpdateDate”
      type=“s:string”/>
      <s:complexType name=“Address”>
```

TABLE 8-continued

ModifyAccountBillToAddress event

```
          <s:sequence>
            <s:element minOccurs=“0” name=“StreetType”
            type=“s:string”/>
            <s:element minOccurs=“0” name=“AddressNum”
            type=“s:string”/>
            <s:element minOccurs=“0” name=“Address”
            type=“s:string”/>
            <s:element minOccurs=“0” name=“City”
            type=“s:string”/>
            <s:element minOccurs=“0” name=“ZIP”
            type=“s:string”/>
            <s:element minOccurs=“0” name=“State”
            type=“s:string”/>
            <s:element minOccurs=“0” name=“Country”
            type=“s:string”/>
          </s:sequence>
        </s:complexType>
      </s:sequence>
    </s:complexType>
  </s:element>
```

TABLE 9

ModifyAccountPaymentData event

```
<s:element name=“AccountModifyPaymentData”>
  <s:complexType>
    <s:sequence>
      <s:element minOccurs=“0” name=“BillAccountCode” type=“s:string”/>
      <s:element minOccurs=“0” name=“LastUpdateDate” type=“s:string”/>
      <s:complexType name=“PaymentData”>
        <s:sequence>
          <s:element minOccurs=“0” name=“BankAccountNumber” type=“s:string”/>
          <s:element minOccurs=“0” name=“BankAccountType” type=“s:string”/>
          <s:element minOccurs=“0” name=“BankBranch” type=“s:string”/>
          <s:element minOccurs=“0” name=“BankName” type=“s:string”/>
          <s:element minOccurs=“0” name=“PayerFirstName” type=“s:string”/>
          <s:element minOccurs=“0” name=“PayerLastName” type=“s:string”/>
          <s:element minOccurs=“0” name=“PayerPersonalID” type=“s:string”/>
          <s:element minOccurs=“0” name=“CreditCardExpirationDate”
type=“s:string”/>
          <s:element minOccurs=“0” name=“CreditCardNumber” type=“s:string”/>
          <s:element minOccurs=“0” name=“CreditCardType” type=“s:string”/>
        </s:sequence>
      </s:complexType>
    </s:sequence>
  </s:complexType>
</s:element>
```

Service order related events 230 may be used for handling the processing of orders for products and services. For example, service order events 230 may be indicative of a transaction originating in a CRM system. As a consequence of the transaction, the service order event 230 may be generated and passed to the billing system. In one implementation, an AssetComponent event 232 may be used to indicate a CRM transaction, and may include information related to products and/or services and the account that should be updated. For example, an AssetComponent event 232 may occur when a service order needs processing, or when information about discounts and provisioning need updating. An AssetComponent event 232 may include a root instance ID, a parent instance ID, a product instance ID, an action code, a product catalogue ID, a service ID, a tariff ID, a start date for the product or service, a modify date for the product or service, an end date for the product or service, a list of attributes for the product or service, and the like. The list of attributes may include a plurality of attribute objects that define an attribute action code, attribute name, attribute value, and the like. An exemplary XML message defining an AssetComponent event 232 is shown in table 10. An exemplary attribute object defined in XML is shown in Table 11.

TABLE 10

AssetComponent event

```
<s:element name=“serviceOrder2”>
  <s:complexType>
    <s:sequence>
      <s:element name=“organizationCode” type=“s:string”/>
      <s:element name=“billingAccountId” type=“s:string”/>
      <s:complexType name=“ProductSO2”>
        <s:sequence>
          <s:element minOccurs=“0” name=“rootInstanceId”
          type=“s:string”/>
          <s:element minOccurs=“0” name=“parentInstanceId”
          type=“s:string”/>
          <s:element name=“productInstanceId” type=“s:string”/>
          <s:element name=“actionCode” type=“s:string”/>
          <s:element name=“productCatalogId” type=“s:string”/>
          <s:element name=“serviceId” type=“s:string”/>
          <s:element name=“tariffId” type=“s:string”/>
```

TABLE 10-continued

AssetComponent event

```
          <s:element name=“startDate” type=“s:string”/>
          <s:element name=“modifyDate” type=“s:string”/>
          <s:element name=“endDate” type=“s:string”/>
          <s:element minOccurs=“0” name=“listOfAttributes”>
            <s:complexType>
              <s:sequence>
                <s:element minOccurs=“0” maxOccurs=“unbounded”
name=“attribute” type=“tns:AttributeSO”/>
              </s:sequence>
            </s:complexType>
          </s:element>
        </s:sequence>
      </s:complexType>
    </s:sequence>
  </s:complexType>
</s:element>
```

TABLE 11

| Attribute obect |
| --- |

```
<s:complexType name="AttributeSO">
  <s:sequence>
    <s:element minOccurs="0" name="actionCode" type="s:string"/>
    <s:element name="name" type="s:string"/>
    <s:element minOccurs="0" name="value" type="s:string"/>
  </s:sequence>
</s:complexType>
```

The action code may define the set of actions associated with a product or service that may be performed by the billing system 108. For example, the billing system may be able to add a product or service, delete a product or service, suspend a product or service, resume a product or service, or update a product or service. These actions may have corresponding actions codes such as "add," "delete," "suspend," "resume," and "update," respectively. Other actions and corresponding codes may also be used. Specific implementations for performing these various actions are described in more detail below with reference to FIGS. 7-12.

As noted above, telecommunication service providers offer interrelated products and services. As described in more detail below, these products and services may be represented hierarchically as a single entity. Accordingly, AssetComponent events 232 may be serviced in various manners. For example, a bundle processing integration model may be implemented in which the entire hierarchical product structure is included in the event 200. For example, a customer may order a cell phone as a parent product, as well as a voicemail service for use on the phone. Under a bundle processing methodology, a single AssetComponent event 232 may be used to represent the ordering of the phone and voicemail. Alternatively, a per-partes processing integration model may be implemented in which each base or child product or service is processed individually. Referring to the example above, two AssetComponent events 232 may be used under a per-partes processing system, one to activate the phone and a second for activating the voicemail. Other processing methods may also be used. The processing of AssetComponent events 232 are discussed in further detail below in reference to FIGS. 6-9.

Figure 3:
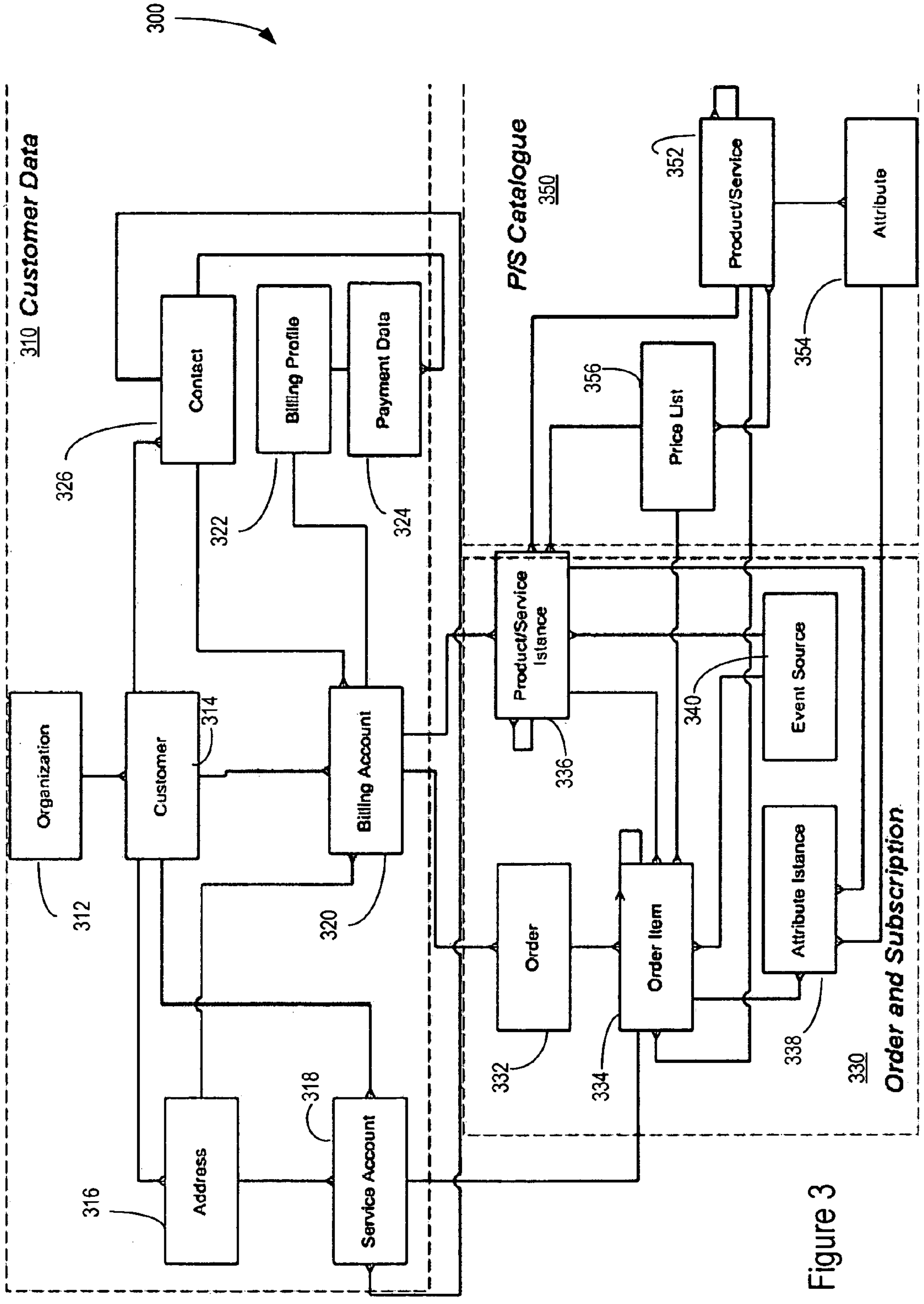
FIG. 3 shows an exemplary logical data model for supporting an end-to-end coherent framework for a telecommunications system architecture.

FIG. 3 shows an example of a logical data model 300 for supporting an end-to-end coherent framework for a telecommunications system architecture. The information contained in the following tables may vary between implementations. The logical data model 300 may be shared across each of the systems of the architecture 100, such as the customer care management system 102, the billing system 108 and the other support systems 106, or may be used by less than all of the systems in the architecture 100. In this example, the logical data model may include customer entities 310, order and subscription entities 330, and product and service entities 350. Other types of information may also be included in the logical model depending on implementation details.

The customer entities 310 represent customer data, and may include an organizational entity 312. For example, a customer entity 310 may represent the legal entity representing the customer data, such as the entity contractually related to the telecommunication service provider and that may be responsible for any dunning action resulting from a failure to promptly pay for products and/or services. The organizational entity 312 may have a one-to-many relationship with customer entities 314. As shown in FIG. 3, the customer entity 314 represents an individual or corporation as the physical or juridical person that has bought or is going to buy a product or service. Each customer entity 314 may be associated with one or more billing account entities 320, which represent the accounting entity to which products and services belong, for which charges are accrued, and to which payments and adjustments may be accounted. For example, a billing account 320 may comprise a telephone number for a wireline service. As a result, the customer entity 314 acts a grouping entity for the billing accounts 320. Additionally, the customer entities 310 may include address entities 316, service account entities 318, contact entities 326, billing profile entities 322, and payment data entities 324 that may be interrelated as shown in FIG. 3. Other relationships between the customer data may also be used.

The order and subscription entities 330 represent orders and subscription data. In the implementation shown in FIG. 3, the order and subscription entities 330 may include product/service instance entities 336 that define a particular instance of a product or service. The product/service instance entities 336 may be related to the billing account entities such that each billing account entity 320 may be related to one or more product/service instance entities 336. In turn, each product/service entity 336 may be associated with one or more additional product/service entities 336, an event source entity 340 that may define the entity that is used by the billing system to guide the usage to the appropriate billing account 320, as well one or more attribute instance 338 that each defines an attribute of the product or service defined by the product/service entities 336. Using the product/service entities 336 and their associated event source 340 and attribute instance entities 338, the logical data model 300 may be used to define a hierarchical relationship between a parent product and its associated services and/or child products. For example, a customer may order a phone that comes with voicemail and a carrying case. Maintaining the relationship among the phone, voicemail and carrying case ensures that an order for the voicemail and/or carrying case will not be processed without the parent product also. Additionally, the order and subscription entities 330 may include order entities 332 that define an order and order item entities 334 that define the items of an order 332.

The logical data model 300 may also include product and service catalogue entities 350. The product and service catalogue entities 352 may define a catalogue of products and services offered by the telecommunications services provider, and may include product and service entities that define archetypical products and services offered by the telecommunications services provider, attribute entities 354 that define attributes of the products and services, and price list entities 356 that define pricing structures for the product and service.

In order to ensure consistency among the various systems of the telecommunications network 100, it may be important to maintain the hierarchical relationships of the logical data model across systems. For example, it may important to avoid processing child products and services if the parent product with which they are associated does not exist. Similarly, maintaining the hierarchical relationship between products and services may also avoid duplicative billing and inaccurately processing bundled packages. Alternatively, or additionally, it may be advantageous to maintain the hierarchical relationship between the customer entities 314 and billing account entities 320 for similar reasons. For example, discounted products and/or services may be offered for preferred customers 314 that maintain multiple billing accounts. By maintaining the hierarchical relationship between customers 314 and billing accounts 320, the interface 146 may ensure that business events may be processed correctly.

Figure 4:
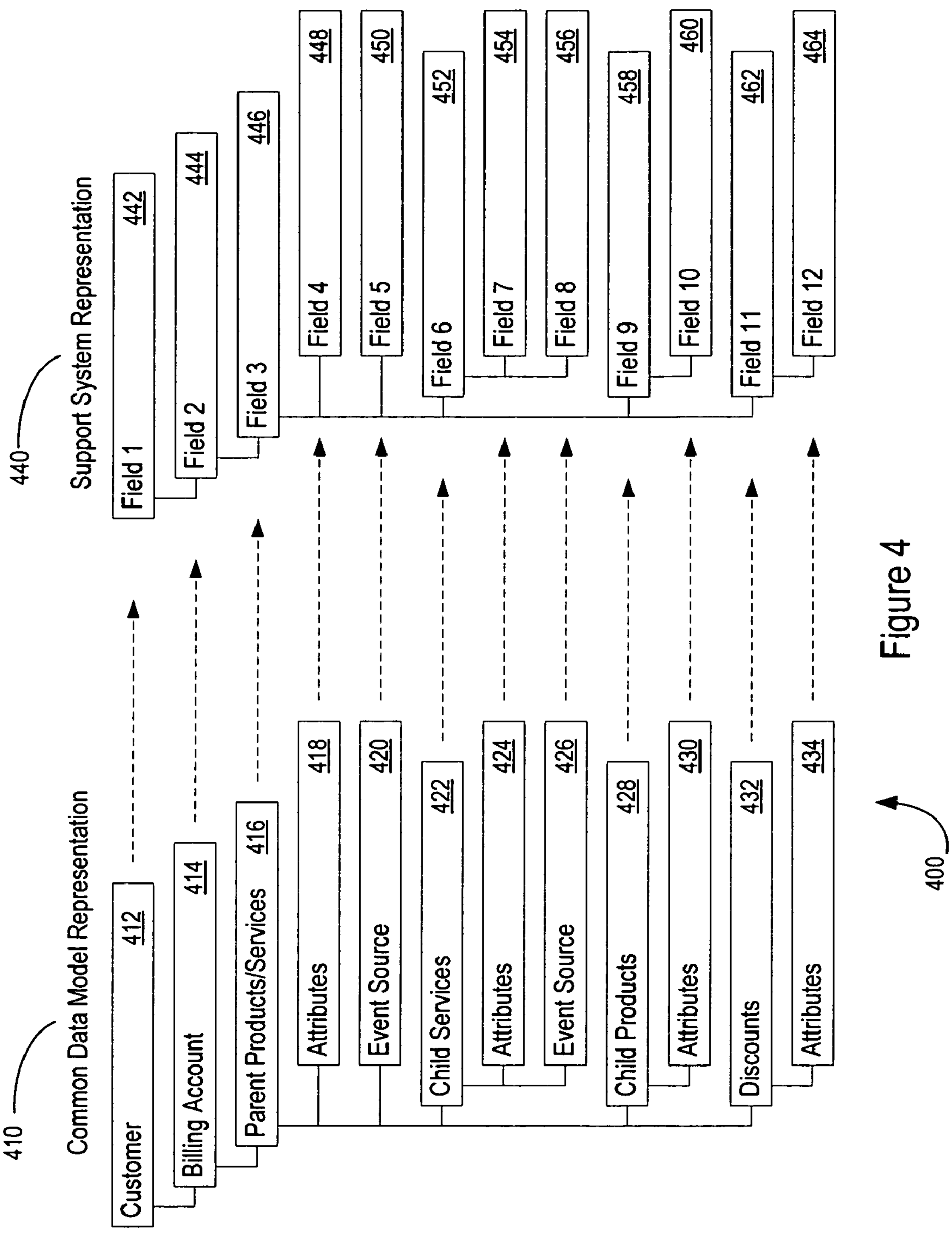
FIG. 4 shows various exemplary hierarchical relationships between data of the data model of FIG. 3 that may be supported and maintained by a robust messaging interface.

FIG. 4 shows a diagram a mapping of hierarchical relationships among data of the common data model 300 and corresponding entities in a support system 106. As illustrated, entities 410 of a common data model, such as the common data model 300, may map to particular entities or fields 440 defined in the support system, such as the billing system 108. For example, the common data model representation 410 may include a customer 412 and one or more billing accounts 414, which may be mapped to fields 442 and 444 in accordance with a data model associated with the billing system 108. The relationships between the entities of the common data model 410 and the fields 440 of the support system database may be embedded within the interface 104. This allows the data to be stored in its most optimal manner within the underlying support system without sacrificing consistency across the various systems. Optionally, a table based approach may be implemented where the relationships are stored in a table. Utilizing a table based approach, system architects may easily update the interface 104 to communicate with new and improving support systems as only the table mapping the items needs to be updated when any new support system 106 is to be added to the architecture 100.

Similarly, relationships among products may also be maintained. For example, main product entities 416 may include one or more component services 422 and child products 428 in accordance with the data model 300. The interface 104 may map these entities to corresponding fields in the support system, such as fields 446, 452, and 458 as illustrated. Additionally, other data items may also be mapped from the common data model to support system equivalents. For example, parent product attributes 418 and event source information 420, component service attributes 424 and event source information 426, child product attributes 430, and discounts 432 and discount attributes 434 may be associated with specific fields of the support system database, such as fields 448, 450, 454, 456, 460, 462, and 464 respectively as illustrated.

As illustrated in FIG. 4, one product represented in the data model 300 may be represented by multiple different support system entities 440. For example, a single product of the data model 300 may map to a product, child product and possibly several services entities 440. In order to overcome the technical problems associated with effectively managing and maintaining these relationships, a product instance table 137 may be used to drive these possible combinations in accordance with the catalogue entities 350 of the data model 300.

TABLE 12

| Data Record Parameter | Description |
|---|---|
| ACS_BILLING_ACCOUNT_ID | ID of customer entity 314 |
| ENTITY_TYPE | Entity Type may be either:<br>P - Product<br>C - Child Product<br>S - Service |
| ENTITY_TYPE_ID | ID of the product or service entity in the billing system |
| ENTITY_INST_ID | ID of the product or service instanced entity in the billing system |
| ENTITY_REF_INST_ID | Related Instance Id |
| PRODUCT_INT_ID | Product Instance ID from the message or event |
| PARENT_INT_ID | Parent Instance ID from the message or event |
| ROOT_INT_ID | Root Instance ID |
| START_DATE | Start date of the validity of the record |
| END_DATE | End date of the validity of the record |
| STATE_FLAG | 'A' Active<br>'C' Cancelled<br>'S' Suspended |

TABLE 12-continued

| Data Record Parameter | Description |
|---|---|
| INS_DATE | Date of inserting record |
| INS_USER | User that has inserted the record |

Figure 5:
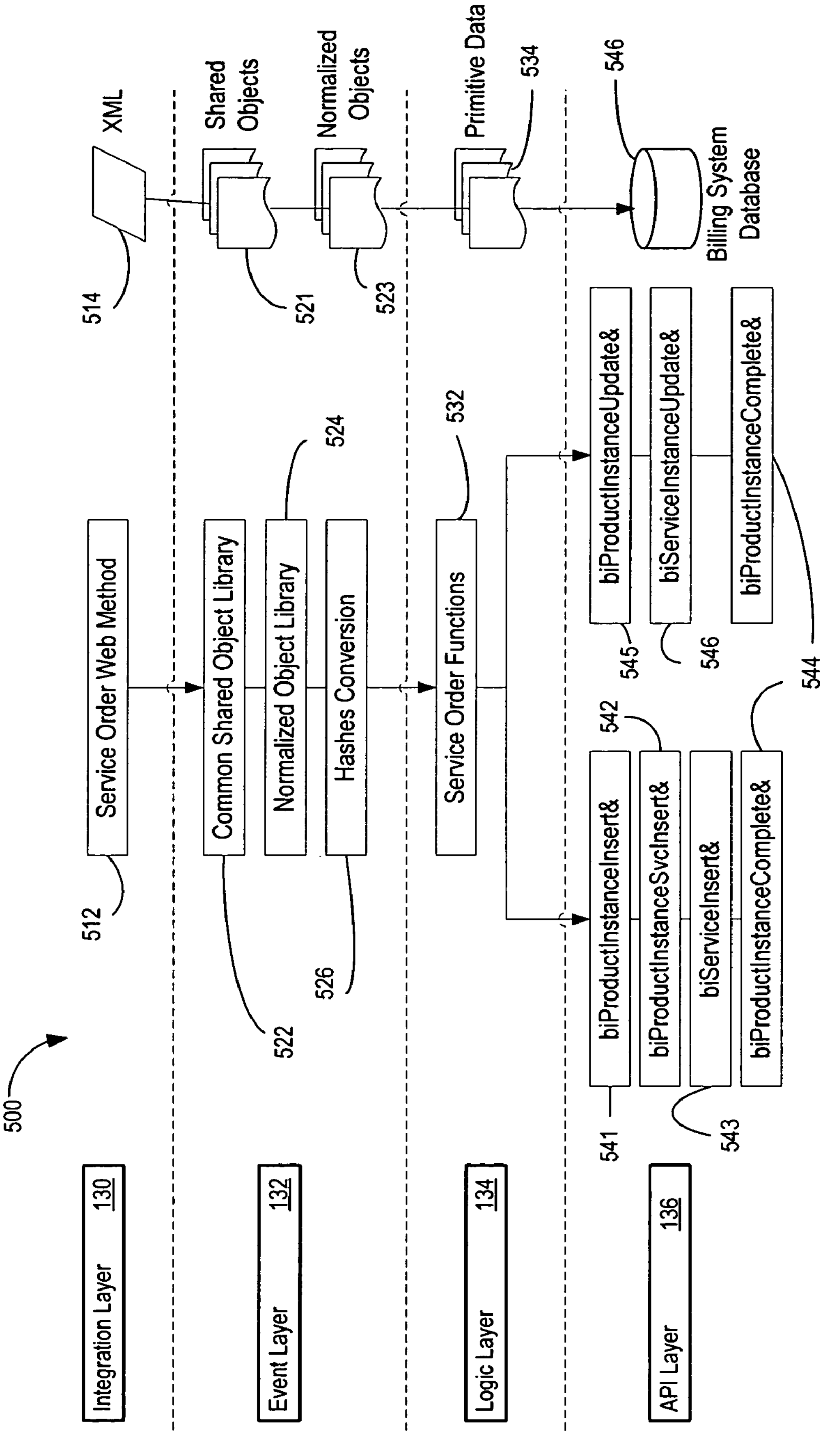
FIG. 5 shows an exemplary logical diagram of a robust messaging interface and certain functions and data types associated therewith.

FIG. 5 shows an exemplary logical diagram of the messaging interface 104. The interface 104 divides functions into layers across the interface 104. In the example shown in FIG. 5, the interface 104 may include an integration layer 130, an event layer 132, a logic layer 134, and a billing system API layer 136. The integration layer 130 may expose the supported messages or events to various external applications, such as the customer care system 102. Additionally, the integration layer 130 may also convert the messages 124 or events into a suitable form for processing by the other layers of the interface 146 or the billing system 108. The integration layer 130 may convert the message to a standard form which adheres to the common data model 300. For example, the integration layer 130 may be implemented as a web service 512 that converts messages from an XML format 514 to a shared object 521 that conforms to the common data model 300 shown in FIG. 2. In other words, the shared object 521 is independent of the underlying billing system. As known, a web service is a Web-based application that dynamically interacts with other Web applications using open standards, such as XML, UDDI, SOAP, and the like. The shared object 521 is a representation of a message, event, product, service or the like that uses data entities that conform to the common data model 300.

The event layer 132 may perform further processing of the shared object 521. For example, the event layer 132 may convert the shared objects 521 into normalized objects 523. The normalized objects 523 may represent an abstraction of the shared object 521 that maintains the relationships defined in the shared object 521 but is structured in terms of billing system 108 entities. In other words, the normalized object 523 may be representation of the shared object 521 that is compliant with the underlying billing system. The event layer 132 may also convert a normalized object 523 into primitive data types 534, such as integers and the like, for use with the billing system 108. The primitive data types 534 may not maintain the relationships of the logical model 300, and may be based on Application Programming Interfaces (APIs) developed for use with the billing system 108. For example, the API may expose specific entities associated with the billing system 108, such as fields in a billing system database 108, by including functions for accessing and manipulating these entities. In order to perform this processing, the event layer 132 may invoke various functionalities of a common shared object library 522, normalized object library 524, and functions from the billing system API, such as hashes conversion functions 526, to convert the normalized object to more primitive data types 534.

The logic layer 134 may manage the set of calls to the billing system 108 in order to implement the business events 300. For example, the logic layer 134 calls functions associated with an API of the billing system 108, which reside at the API layer 136, to process a message or event. For example, one or more API calls may implement a specific event, such as creating a new customer account in the billing system and populating that account with customer account data. Depending on the message or event to be processed, the interface 104 may call various functions. The logic layer 134 may utilize the primitive data types 534 in order to implement these function calls.

The example shown in FIG. 5 shows a logic layer 134 which includes a service order function 532 that handles the processing of an AssetComponent event 232. For example, the function 532 may invoke a ProductInstanceInsert function 541 to insert a new product instance, a ProductInstanceSvcInsert function 542 to insert a new product dependent service, a ServiceInsert function 543 to insert a new product independent service, and a ProductInstanceComplete function to finalize the addition of a new product or service. Additionally, the service order function 532 may also call a ProductInstanceUpdate function 545 to update information associated with existing products, and a ServiceInstanceUpdate function 545 to update information associated with existing services. Other functions of the billing system API 136 may be invoked to perform the processing of an AssetComponent event 232, or any other event 200 that may be supported by the interface 104.

By segmenting the functionality of the interface 104 into layers, the interface 104 may be more readily reusable. For example, the functionalities of the interface layer 130 do not depend on the underlying support system 106. Accordingly, the same integration layer 130 may be used to support a multitude of underlying support systems 106. In order to configure the interface for a specific support system 106, a system architect may modify the event layer 132 to create normalized objects 523 for the new support system 106 and modify the logic layer to call those functions offered by the new support systems' API 136. As a result, message or event processing may be standardized within the interface 104, and the architecture 100 may readily take advantage of a wide variety of support systems without worrying about the event handling limitations of those underlying support systems 106.

Figure 6:
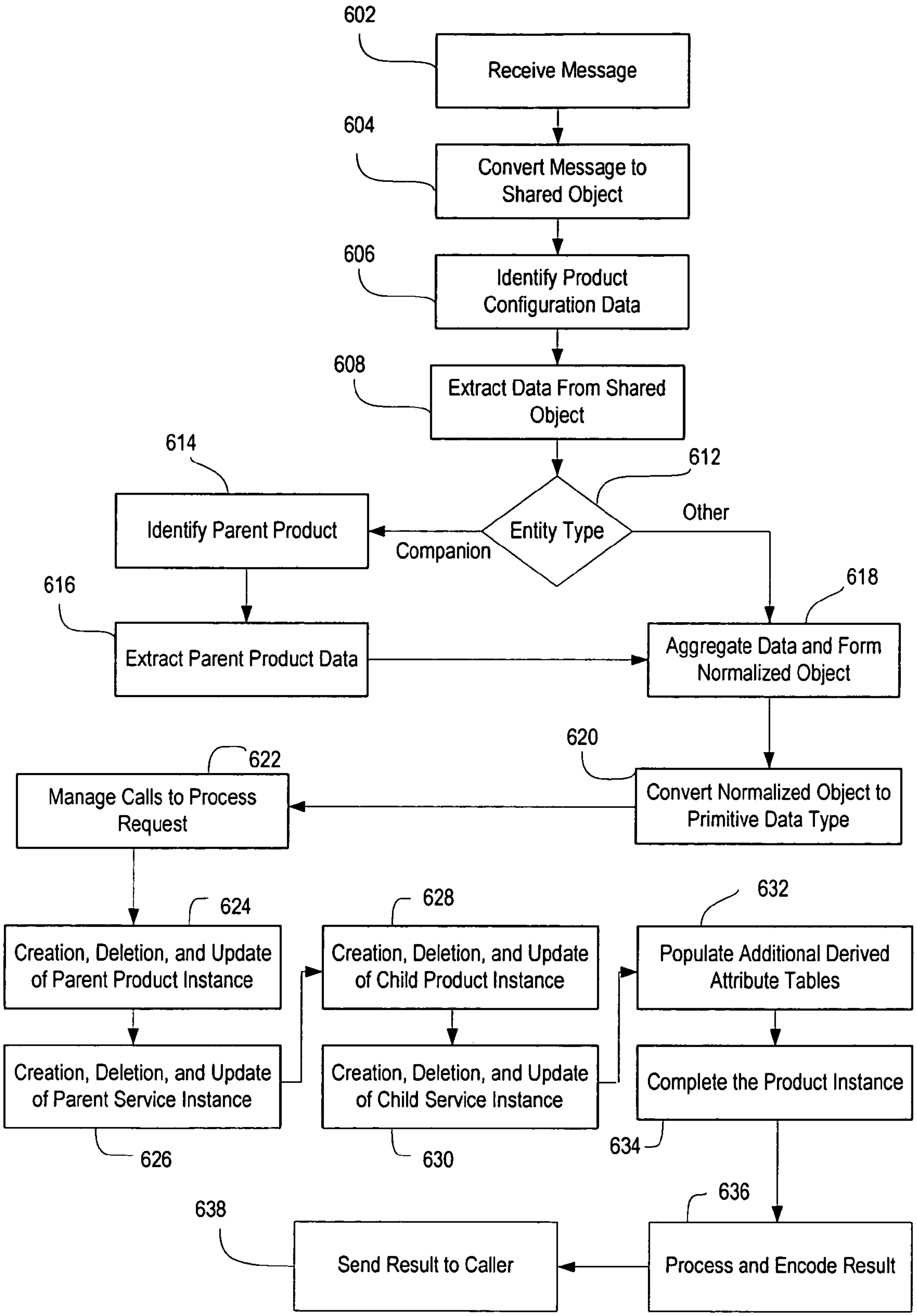
FIG. 6 shows the acts that the messaging interface may take to process an order.

FIGS. 6-10 are exemplary flow diagrams showing the logical process flow occurring in the messaging interface 104. FIG. 6 shows the acts that the messaging interface 104 may take to process an order, such as, for example, to process an AssetComponent business event 223. As illustrated, the interface 104 may be adapted to handle per-partes processing of an AssetComponent business event 232. Initially, an XML message defining an AssetComponent business event 232 having a single product, service, or child product is received by the interface 104 (act 602). This message may be initiated by any of the systems of the architecture 100, such as the customer care system 102.

Next, the integration layer of the messaging interface converts the message into a shared object (act 604) that represents a common data model 300 representation of the event 232. Once the shared object is formed, the interface 104 proceeds to convert the shared object to a normalized object. A two-step process may be used perform this conversion. First, the interface 104 may identity product configuration data associated with the product or service (act 606). Product configuration data may include data needed by the underlying billing system and that may be used during the conversion of a shared object 521 to a normalized object 523. Next, the interface 104 may extract product data from the shared object representation (act 608). This data may include actual product attributes supported by the data model 300 as well as derived attributes for use in the underlying support system 106.

As noted above, FIG. 6 represents a per-partes processing of an AssetComponent event 232. Accordingly, the interface 146 next identifies an entity type for the specified product or service (act 612). Depending on the identified type, additional processing of may be performed to ensure the proper handling of the event 232. For example, if a child product is identified, the interface may identify a parent product instance associated with the child product (act 614) and extract the associated based product information (act 616). On the other hand, if the interface determines that a parent product or service is being processed, no additional processing may be required.

Next, the product and/or service data may be aggregated and transformed into a normalized object using entities of the billing system 108 (act 618). As noted above, the normalized object represents a hierarchical view of the AssetComponent defined in terms of support system entities, such as entities used by the billing system 108. The normalized object may then be converted into more primitive data forms for use by the billing system, such as integers, strings, and the like (act 620).

Once the data is suitable for processing by the billing system 108, the interface may call a series of functions supported by the billing system 108 to process the request (act 622). As illustrated, the interface 146 may invoke functions, for example, by a remote procedure call or the like, to create, delete and/or update a parent product instance in the billing system (act 624), create, delete and/or update a base service instance in the billing system (act 626), create, delete and/or update a child product instance in the billing system (act 628), create, delete and/or update a child service instance in the billing system (act 630), populate any additional derived attribute data in the billing system (act 632), and to complete processing of a product or service instance in the billing system (act 634). Finally, the interface 146 may process and encode the result of the call (act 636) and send this reply back to the architectural component that initiated the event (act 638). This may include a valid or successful result, an error code, and the like.

Figure 7:
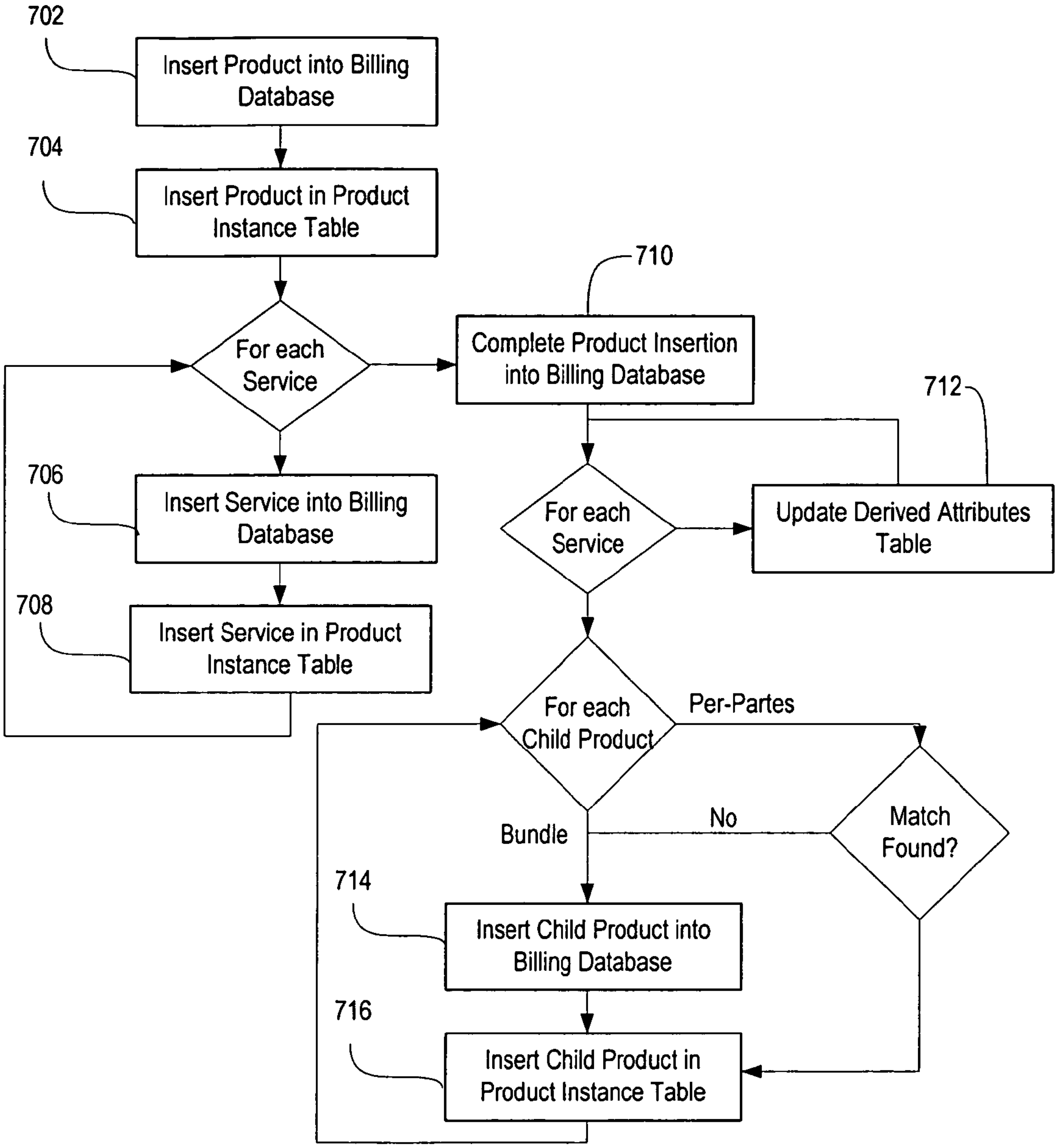
FIG. 7 shows the acts that the messaging interface may take to activate product and/or service.

FIG. 7 shows the acts that the messaging interface 104 may take to implement an event for activating a product and/or service. The interface 104 may initially call the appropriate API function, ProductInstanceInsert 541, to insert the product into the billing system database 548 (act 702). If this call is successful, the interface 146 may then insert a corresponding entry in the product instance table 137 (act 704). As noted above, inserting entries in the product instance table 137 after a successful call to the underlying support system 106 allows order processing to be tracked accurately in the event of an error. Next, the interface may employ a similar technique for entering any services of the order. As illustrated, the interface 146 inserts an entry for each service in the product instance table 137 (act 708) after successfully inserting the service into the billing system database 548 (act 706). Next, the interface may complete the insertion of the product by calling the appropriate function (act 710). Optionally, the interface may also update any derived attributes associated with each service for use by the billing system 108 (act 712). As a result, the interface may overcome limitations of the underlying billing system to enable a multilevel relationship among multiple attributes of a product.

The interface 104 may also insert child products into the billing system 108. Depending on the integration model employed, the acts of the interface 146 may vary. As illustrated, the interface 104 may insert the child product directly into the billing system database 548 (act 712) and product instance table 137 (act 714) when implementing bundle processing. However, when per-partes processing is employed, the interface 104 may determine if an entry exists for the child product. If there is no corresponding entry, a new instance is inserted into the billing system database 548 (act 716) and the product instance table 137 (act 718). If an entry does exist, however, only a new product instance entry may need to be inserted (act 718).

Figure 8:
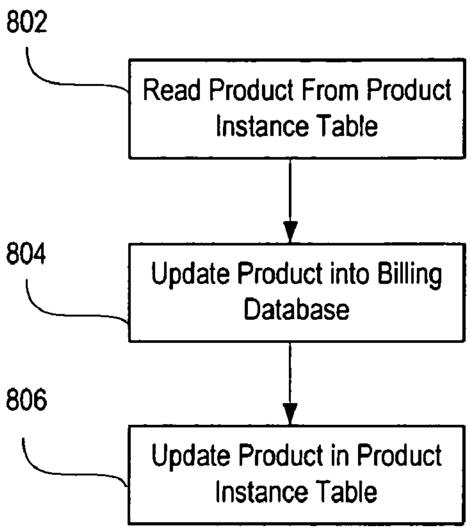
FIG. 8 shows the acts that the messaging interface may take to delete, suspend, or resume a service.

FIG. 8 shows the acts that the messaging interface may take to implement an event for deleting, suspending, or resuming a service. Initially, the product instance record corresponding to the product or service of the request is read from the product instance table 137 (act 802). Next, the product is updated in the billing system by calling the appropriate billing system API function (act 804). Finally, the product instance record is updated after a successful call (act 806).

Figure 9:
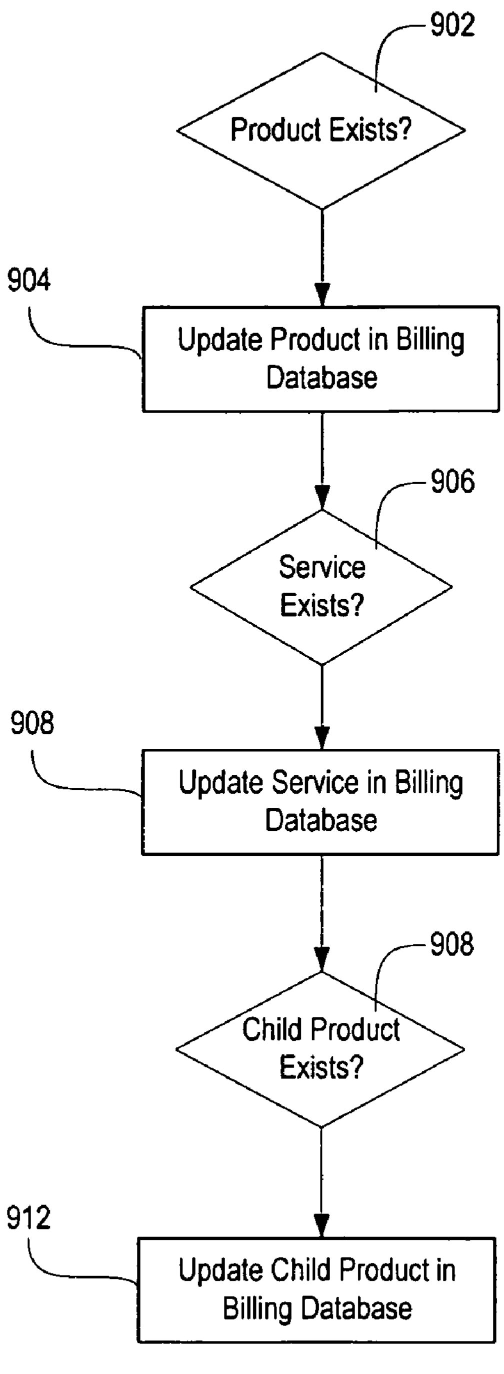
FIG. 9 shows the acts that the messaging interface may take to updated a service.

FIG. 9 shows the acts that the messaging interface may take to updated a service. Initially, the product included in the request is verified in the product instance table 137 (act 902). If the product is successfully verified, the product may be updated in the billing system database 548 (act 904). Similarly, the interface 104 may verify entries in the product instance table 137 for each service (act 906) or child product (act 910) before updating the services or child products in the billing system database 548 (acts 908 and 912, respectively).

Figure 10:
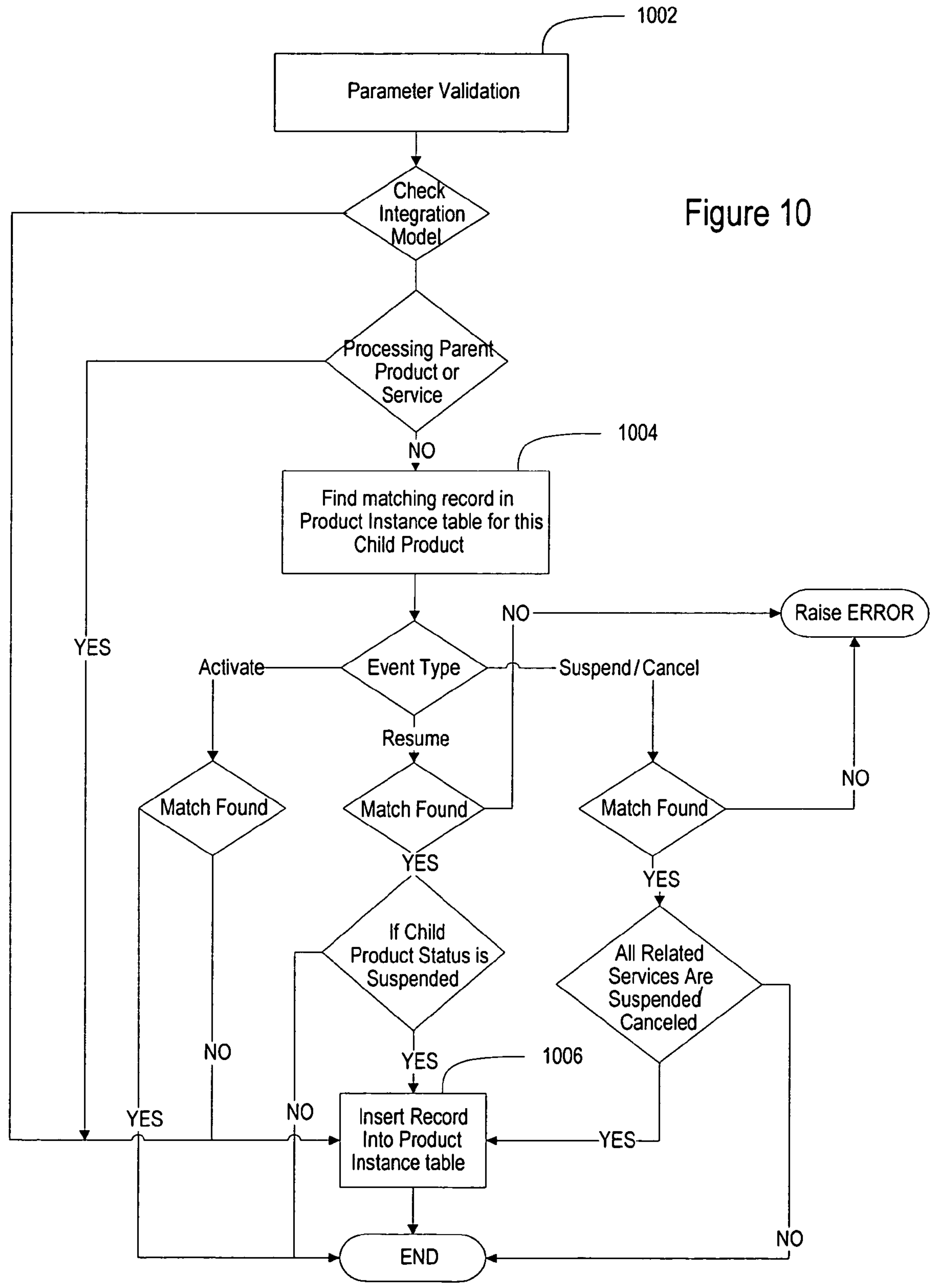
FIG. 10 shows the acts that the messaging interface may take to manage insertions to a product instance table.

FIG. 10 shows the acts that may manage insertions into a product instance table 137. Initially, the parameters of the call may be validated (act 1002). Next, the integration model is verified. If bundle processing is being performed, a record may be directly inserted into the product instance table 137 (act 1004). If per-partes processing is being implemented, however, a check may be performed to determine whether the product is a parent product or service. If the product or service is a parent product, an entry may be inserted into the product instance table 137 (act 1004). If the product or service is not a parent product or service, however, a search may be performed to find an entry in the product instance table 137 for this child product (act 1006). Depending on the action code associated with the business event being processed and the existence of a matching entry in the product instance table 137, different functions may be appropriate. For example, if the request is to activate a child product and no match is found, an entry may be inserted into the product instance table 137 (act 1004). If an entry already exists, however, no further action is required.

Alternatively, the action code may include a resume request. If a matching entry does not exist for a child product associated with a resume request, an error may be thrown (act 1008). If a match is present, a check may be performed to verify that the current status of the child product or service is 'suspend,' If not, no action may be necessary. If the child product or service is currently suspended, the product instance table 137 (act 1004) may be updated to reflect the change in status. Similarly, a suspend or cancel request may throw an error if no the child product or service does not already have a corresponding entry in the product instance table 137 (act 1008). If all services associated with the child product or service are suspended or canceled (depending on the type of request), the product instance table 137 may be updated (act 1004).

The messaging interface 104 employs several technical solutions to the technical problems of efficiently, flexibly, and reliably extending the functionality of a telecommunications service provider processing architecture in order to facilitate communications between telecommunication service provider processing systems. As a result, a system architect is not limited by the time consuming complexities typically associated with integrating a new component into the architecture.

One technical solution is the use of layering the functionalities of the interface 104 to make the interface 104 as reusable as possible. Functionalities that depend on the underlying support system 106 to be integrated may be separated from those dependent functionalities so that only a small portion of the interface 104 may need to be adapted for integrating a new support system 106.

Another technical solution lies in removing core message or event processing from the underlying support system 106 to the interface 104. In the past, system architects were at the mercy of the processing performance and functionalities of the underlying support system 106. By moving this aspect to the interface 104, the system architect can define a common set of message or events that may be used across multiple different support systems 106. Again, this alleviates the dependency of the architect on the capabilities of the support system 106, and allows the architect to choose from a wider variety of underlying support systems 106.

Another technical solution is provided in maintaining various hierarchical relationships between support systems 106. In particular, the hierarchies of data elements in one system may be maintained as data is transferred through the architecture 100, such as hierarchical relationships between products, services and the like. This ensures the integrity of product offerings and the like, for example, such that child products or services may not be inadvertently processed without an underlying parent product.

Yet another technical solution is provided by maintaining a correlation between support system specific product identifiers. For example, a table may be used to store identifiers of products, services and the like. Identifiers used in specific support systems 106 may be associated such that the table provides a mapping from the identifier used in one system to a corresponding identifier used in a second system. This mapping allows the interface 104 to track processing of orders and verify that account modifications are intended for valid products that already exist in each system.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A messaging interface for communication between telecommunications service provider processing systems, the messaging interface comprising:

a product instance table for maintaining a relationship between a first product instance identifier and a second product instance identifier;

a memory comprising:

message parameters which report an event, the message parameters associated with a first telecommunication service provider processing system and including the first product instance; and a multiple layer messaging interface comprising:

a first set of instructions implementing an integration layer, the integration layer operable to construct a shared data object based on the message parameters;

a second set of instructions implementing an event layer, the event layer operable to convert the shared data object to a plurality of telecommunications service provider processing system data objects associated with the second telecommunications service provider processing system;

a third set of instructions implementing a logic layer, the logic layer operable to perform an action on the second telecommunications service provider processing system, the action associated with the second product instance identifier and further operable to update the product instance table using the first product instance identifier and the second product instance identifier to maintain consistency between the first telecommunications service provider processing system and the second telecommunications service provider processing system; and a processor coupled to the memory and the product instance table which executes the first, second, and third set of instructions.

2. The messaging interface of claim 1, wherein the event is one selected from the group comprising a create customer event, a modify customer general data event, a modify customer fiscal address data event, a create billing account data event, a modify billing account general data event, a modify billing account profile data business event, a modify billing account bill-to person data event, a modify billing account bill-to address data event, a modify billing account payment data event, and an service order event.

3. The messaging interface of claim 1, wherein the event layer is further operable to:

convert the shared object to a normalized data object, the normalized data object comprising a representation of the shared object and associated with the second telecommunications service provider processing system; and convert the normalized object to the plurality of telecommunications service provider processing system data objects.

4. The messaging interface of claim 1, wherein the logic layer is further operable to:

executes a series of functions of the telecommunications service provider processing system API in order to perform the action.

5. The messaging interface of claim 3, wherein the shared object further comprises data representative of a hierarchical representation of at least two of a product, a service, and a child product, and wherein the normalized object maintains the hierarchical relationship.

6. The messaging interface of claim 3, wherein the shared object further comprises data representative of a hierarchical representation of a customer and a billing account, and wherein the normalized object maintains the hierarchical relationship.

7. The messaging interface of claim 1, wherein the logic layer is further operable to generate a reply message based a result of the action.

8. The messaging interface of claim 1, wherein the logic layer is further operable to update the product instance table only after the third set of instructions successfully perform the action.

9. The messaging interface of claim 1, wherein the interface layer is further operable to which:

retrieve information from the product instance table; and construct the shared object based on the retrieved information and the message parameters.

10. A method for communication between telecommunications service provider processing systems, the method comprising:

maintaining a product instance table for maintaining a relationship between a first product instance identifier and a second product instance identifier;

receiving message parameters which report an event, the message parameters associated with a first telecommunication service provider processing system and including the first product instance;

constructing a shared data object based at least some of the message parameters;

converting the shared data object to a plurality of telecommunications service provider processing system data objects associated with the second telecommunications service provider processing system;

performing an action on the second telecommunications service provider processing system, the action associated with the second product instance identifier;

updating the product instance table using the first product instance identifier and the second product instance identifier to maintain consistency between the first telecommunications service provider processing system and the second telecommunications service provider processing system.

11. The method of claim 10, wherein the event is one selected from the group comprising a create customer event, a modify customer general data event, a modify customer fiscal address data event, a create billing account data event, a modify billing account general data event, a modify billing account profile data business event, a modify billing account bill-to person data event, a modify billing account bill-to address data event, a modify billing account payment data event, and an service order event.

12. The method of claim 10, further comprising:

converting the shared object to a normalized data object, the normalized data object comprising a representation of the shared object and associated with the second telecommunications service provider processing system; and converting the normalized object to the plurality of telecommunications service provider processing system data objects.

13. The method of claim 10, further comprising:

executing a series of functions of the telecommunications service provider processing system API in order to perform the action.

14. The method of claim 12 wherein the shared object further comprises data representative of a hierarchical representation of at least two of a product, a service, and a child product, and wherein the normalized object maintains the hierarchical relationship.

15. The method of claim 12, wherein the shared object further comprises data representative of a hierarchical representation of a customer and a billing account, and wherein the normalized object maintains the hierarchical relationship.

16. The method of claim 10, further comprising:

generating a reply message based a result of the action.

17. The method of claim 10, wherein the product instance table is only updated after the action is successfully performed.

18. The method of claim 10, further comprising:

retrieving information from the product instance table; and constructing the shared object based on the retrieved information and the message parameters.

* * * * *

UNITED STATES PATENT AND TRADEMARK OFFICE

CERTIFICATE OF CORRECTION

PATENT NO. : 7,894,584 B2
APPLICATION NO. : 11/403275
DATED : February 22, 2011
INVENTOR(S) : Andrea Cesarini et al.

It is certified that error appears in the above-identified patent and that said Letters Patent is hereby corrected as shown below:

On the Title Page

Left column, item (75), after “Garrano,” replace “Florano” with --Fiorano--.

In column 3, line 46, before “Service Order event” replace “an” with --a--.

In column 5, line 66, before “logic layer 134,” replace “an” with --a--.

In column 17, TABLE 11, line 3, replace “Attribute obect” with --Attribute object--.

In column 23, line 13, before “a service. Initially,” replace “updated” with --update--.

Signed and Sealed this
Fourth Day of October, 2011

David J. Kappos

David J. Kappos
*Director of the United States Patent and Trademark Office*